Aug. 7, 1962
B. A. R. LUNDGREN ET AL
3,047,908
METHOD FOR THE MANUFACTURE OF STEAM-CURED LIGHT-WEIGHT CONCRETE PRODUCTS
Filed June 16, 1960
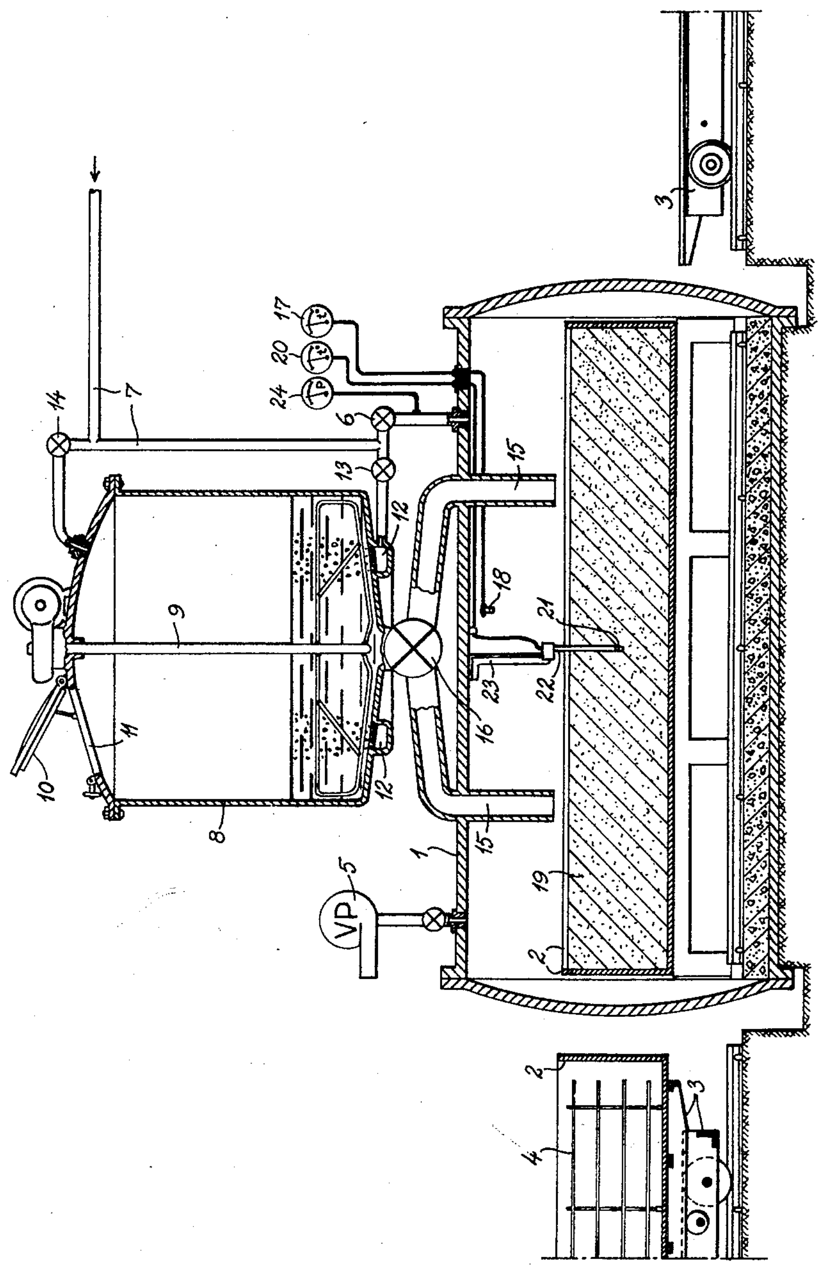
INVENTORS
BENGT ARNE RICHARD LUNDGREN
SVEN JOHAN BORELIUS
BY James M. Heilman
ATTORNEY.

United States Patent Office 3,047,908 Patented Aug. 7, 1962

3,047,908

METHOD FOR THE MANUFACTURE OF STEAM-CURED LIGHT-WEIGHT CONCRETE PRODUCTS

Bengt Arne Richard Lundgren, Saltsjobaden, and Sven Johan Borelius, Sollentuna, Sweden, assignors to Casius Corporation Limited, Montreal, Quebec, Canada Filed June 16, 1960, Ser. No. 36,509
4 Claims. (Cl. 18—47.5)

The present invention relates to the manufacture of steam-hardened light-weight concrete products, particularly of the cellular type, produced by casting a foamed concrete mass or a concrete mass containing a gas developing agent causing the mass to expand in the mold. More particularly the invention relates to a method in connection with those steps in the manufacture of such products which are concerned with the casting, making-porous and hardening the light-weight concrete mass.

The main object of the invention is to eliminate all those disadvantages which, in accordance with the methods hitherto used for the manufacture of the products referred to, are involved by the fact that the products in a still unhardened condition have to be transported between two or more different stations in the manufacturing plant for being subjected to different treatments. This handling and transport frequently results in a considerable waste because of crack-formations and other damages in many of the products.

Another object of the invention is to make possible such an accurate control of the milieu in which the chemical reactions within the light-weight concrete mass take place during the setting and hardening thereof that the risk for thermal cracks, burst damages and damages due to internal stresses in the products will be reduced or completely eliminated.

Still another object of the invention is to make possible the manufacture of light-weight concrete products on a hydraulic cement basis under such conditions, particularly at such an increased temperature, that the formation of hydrated dicalcium silicate, which is unfavourable for the structural strength of the products, will be reduced while at the same time the more favourable formation of mono-calcium silicate will be increased during the setting of the light-weight concrete mass.

A further object of the invention is to make possible the manufacture of cellular or porous light-weight concrete products in such a manner that an acceleration of the steam-hardening process is achieved by avoiding the use of normally uncondensable gases for making the light-weight concrete mass porous so that such gases do not prevent the penetration of the steam into the products.

An additional object of the invention is to reduce the costs for the plant for manufacturing the light-weight concrete by eliminating the necessity of expensive arrangements, required in plants of the kind as hitherto used, for the handling of the light-weight concrete products when they are still unhardened and therefore extremely easily injured. In connection therewith the production costs are also considerably reduced.

The present invention is primarily derived from a consideration of the well-known fact that light-weight concrete products can relatively easily be divided or cut to the extent required also after having been steam-hardened and according to the invention no cutting at all is carried out before the steam-hardening process. This is, of course, a remarkable departure from the line of development previously followed within the technical field referred to but surprisingly this departure results in a considerable rationalization of the entire manufacturing process, since the modern building art requires so close tolerances in the size of the light-weight concrete products that a subsequent machining of the hardened products will most frequently be necessary, also if the products have been cut to approximate size already before the steam-hardening.

The most characterizing feature of the present invention is that the light-weight concrete mass is cast in a mold which is already located in that chamber where the steam-hardening process subsequently will take place, so that the mold with the cast products can remain stationary until the concrete mass has set and the steam-hardening process has been carried out.

During the casting and setting of the concrete mass in the mold the chamber may, of course, be open, but preferably it is kept closed already at this time to separate the contents of the chamber from the external atmosphere while at the same time an artificial atmosphere is maintained in the chamber. By an artificial atmosphere is understood a milieu which is different from the external atmosphere in respect of either the temperature or the pressure or both, and which furthermore may be established, partly or mainly, by means of gases or gas mixtures other than air and then preferably by steam.

A change of pressure in the chamber during and/or immediately after the casting operation can be favourably utilized in many ways, particularly for controlling the expansion of a cellular light-weight concrete mass in the mold. In the manufacture of porous light-weight concrete products by casting a concrete mass which has been foamed by blowing or whipping a gaseous medium thereinto it has thus proved advantageous to reduce the pressure in the chamber during and/or immediately after the casting so as to cause the gas incorporated in the light-weight concrete mass to expand. Hereby a possibility for a further development of the production of various foamed light-weight concrete products is opened.

The possibilities of carefully controlling and varying the conditions of temperature in the chamber during the casting, the subsequent expansion, if any, and the setting of the light-weight concrete mass in the mold primarily allow the manufacture of improved products in that thermal cracks, burst damages etc. can be avoided. By maintaining an increased temperature during the setting of the products in the mold—preferably a temperature at or in the vicinity of 100° C.—it is, moreover, possible to control the chemical reactions within the light-weight concrete mass to thereby also improve the strength and durability of the products obtained. This thermal control of the chemical reactions is of particular interest in connection with the manufacture of light-weight concrete products from a concrete mixture containing a hydraulic cement such as Portland or slag cement as a binder, because it will then be possible to suppress the formation of undesired hydrated di-calcium silicate and to instead promote the formation of valuable mono-calcium silicate.

The e.g. adiabatic course, which is desired, is suitably controlled by means of particular measuring devices which are embedded in the central portion of the setting concrete mass to make possible a checking of the temperature and/or pressure therein and thus permit an adjustment of the temperature and/or pressure in the chamber in accordance therewith. Such an arrangement offers wide possibilities for complete automatization with all the advantages deriving therefrom.

Steam is preferably used for the control and variation of the pressure and temperature conditions in the chamber, because this medium must, under all circumstances, be introduced into the chamber to effect the steam-hardening of the light-weight concrete products.

It has been found particularly advantageous to first prepare the mold, equip it with all such reinforcing units, e.g. mats or cages, which are desirable in the products to be manufactured, and to insert it in the hardening chamber. Thereafter the chamber is closed and evacuated and finally the pressure and the temperature in the chamber are adjusted by admitting steam already before the light-weight concrete mass is introduced into the chamber and cast in the mold located therein. The pressure maintained in the chamber by the aid of the steam during the casting operation is then preferably lower than or equal to the pressure outside the chamber.

Besides making possible a considerable improvement of the results achieved by the manufacture of cellular light-weight concrete products according to rather conventional methods, as indicated above, the invention may also be utilized for carrying out a radically new method in the production of cellular light-weight concrete products, which method will now be described more in detail. The main feature of this new method is that the light-weight concrete mass is rendered porous by the introduction of steam therein and this method has proved to give particularly promising results.

According to this new manufacturing process, which cannot be carried out without using the basic idea of the present invention, a light-weight concrete mass of suitable composition is first made up and then heated to 100° C. by blowing steam therethrough so that all possible air in the mass is removed. When the mass has reached the temperature set forth, a foaming agent is added and the mass is foamed by continued blowing of steam thereinto. The light-weight concrete mass thus made porous is then cast into the mold in the chamber which has been heated to 100° C. by supplying steam thereinto, whereupon the temperature within the chamber is first adjusted to follow up the increase of temperature of the light-weight concrete mass setting in the mold, until said mass has obtained a sufficient rigidness to be able to withstand minor variations of pressure. Thereafter the temperature is increased to the range necessary for hardening the products.

This new method will now be described more in detail with reference to the accompanying drawing which diagrammatically illustrates a plant for carrying out the method. After the exclusion of certain details this plant can, however, also be used for casting and steam-hardening light-weight concrete products of any kind, such as those produced from a light-weight concrete mass made porous by the addition of aluminum powder. It is believed, however, that this does not require any closer explanation in view of what has been previously set forth about the general application of the invention.

On the drawing reference numeral 1 designates an autoclave having removable end walls at both its ends. Inside the autoclave there are means for supporting a mold 2, which, for example, may be transported into the autoclave by means of a truck 3, when suitable reinforcing cages or mats 4 have been arranged in the mold, as indicated to the left on the drawing.

When the mold has been inserted into the autoclave 1, the latter is closed and evacuated by means of a suitable pump 5 and steam is then introduced through a valve 6 from a conduit 7 so as to heat the mold 2 and the reinforcing units present therein to a temperature of 100° C. At the same time the pressure in the autoclave 1 is brought back to the pressure of atmosphere by the steam introduced. The mold in the autoclave chamber is now ready for casting.

While the autoclave has been made ready, a light-weight concrete mass of suitable composition has been made up for casting in a mixer 8 situated above the autoclave 1. The mixer may suitably be provided with an agitator 9 and has a top opening 11, which may be closed by means of a lid 10 and through which the necessary ingredients of the mass may be introduced. In this particular case the mixer 8 has, moreover, its bottom provided with means 12 for blowing-in steam, through which steam from the duct 7 and through the valve 13 can be blown into the light-weight concrete mixture from below. Through a valve 14 steam can also be introduced into the upper part of the mixer 8 to secure a rapid transfer of the contents of the mixer into the mold in the autoclave 1 through ducts 15 connected to the bottom of the mixer 8 through a valve 16, which is only kept open during the casting process.

According to the beforementioned improved method the making-up of the light-weight concrete mass in the mixer 8 is carried out in such a manner that the ingredients are first charged into the mixer and mixed by means of the agitator 9, whereupon the mixture is heated to the boiling point of water by injecting steam through the valve 13 and the inlets 12 into the mixture. During this heating process the top opening 11 of the mixer is kept open.

When the mixture has reached the desired temperature a foaming agent is added and carefully distributed in the mass by means of the agitator 9, while the injection of steam is continued. The mass present in the mixer 8 is hereby caused to expand, since the injected steam will now be retained in the heated mass to form small bubbles therein. When the desired volume of the mass has been reached, the casting process can take place, the lid 10 being then closed and the valve 16 opened. At this time steam may also be injected through the valve 14 into the top of the mixer to more rapidly expel the porous light-weight concrete mass.

In the drawing it is assumed that a casting process has recently been finished so that the preparations for making-up of a new charge of light-weight concrete mass have just started. The valve 16 is, of course, then closed again.

After the casting of the mass into the mold 2 the temperature in the autoclave 1 is carefully increased by supplying fresh steam through the valve 16, so that the temperature within the autoclave, which can be checked by means of an instrument 17 connected to a temperature sensitive body 18 inside the autoclave, is continuously adjusted to follow the internal temperature of the light-weight concrete mass 19 in the mold 2, which latter temperature can, in turn, be checked by another instrument 20 connected to a temperature sensitive member 21 arranged at the end of a rod 22, which can be vertically adjusted along a guide member 23 within the autoclave. When the mass 19 is being cast, the temperature sensitive member 21 is lowered to occupy a position substantially in the middle of the mass contained in the mold and first when the ready-made product is to be removed from the autoclave this member is again retracted.

During the setting of the light-weight concrete mass certain exothermic chemical reactions will, as well known, take place therein and these reactions will result in a continuous increase of the temperature of the mass 19. By carefully checking this temperature and by adjusting the temperature within the autoclave chamber so as to follow up the increase of said internal temperature of the mass it is possible to eliminate the risks for thermal cracks, burst damages and inner stresses in the product. A manometer 24 also makes possible a continuous control of the pressure within the autoclave chamber.

First when the light-weight concrete mass 19 in the mold 2 has become so rigid that the minor pressure variations cannot result in any decomposition or bursting of the fine cellular structure—the period of time required for this must be determined in an empirical way—the very careful gradual increase of temperature can be followed by a more rapid increase of temperature in the autoclave to, for example, 180–185° C., whereupon the steam-hardening may be continued in a conventional manner.

If a light-weight concrete mass on the basis of Portland or similar hydraulic cement is used, the unfavourable formation of hydrated di-calcium silicate will be reduced, as previously pointed out, so that the strength of the product will be considerably increased due to the fact that both the casting procedure as well as the preparatory setting process of the light-weight concrete mass are allowed to take place at an increased temperature.

When the steam-hardening process has been finished, the mold 2 with its contents is removed from the autoclave now opened, the mold is emptied and returned for receiving a new charge, while the light-weight concrete body produced therein is divided into smaller products such as slabs or blocks.

By using steam for making the concrete mass porous as described many marked advantages are achieved, especially because steam is not an uncondensable gas which must first be removed from the light-weight concrete mass before the steam-hardening process can take place in the most efficient manner. The value of this will, perhaps, be most evident when considering the difficulties that may arise when extraneous gases are to be removed from a solidified but not yet hardened light-weight concrete body, which is divided into smaller pieces first later on which may have dimensions even of the magnitude 10 x 10 x 80 feet.

What we claim is:

1. A method in the manufacture of steam-hardened cellular concrete products comprising the steps of placing a mold in a closed chamber, preparing an expansible light weight concrete mass containing ingredients capable of forming gas bubbles in said mass as a result of chemical reactions therein, casting said expansible light weight concrete mass in said mold while creating an artificial atmosphere in said chamber to promote and control said chemical reactions and consequently the expansion of said mass, allowing said mass to solidify under fully controlled conditions in said mold while the latter remains stationary in said closed chamber, admitting steam into said chamber when said expanded light weight concrete mass in the mold has solidified sufficiently to be self-supporting to thereby cure said solidified mass in said stationary mold, and finally taking out the hardened cellular concrete body formed by said expanded mass from said chamber and mold.

2. The method as claimed in claim 1, further characterized by keeping the temperature in said chamber in the vicinity of 212° F. during the casting and solidification of said concrete mass, and subsequently further increasing said temperature to effect curing of the molded mass.

3. A method in the manufacture of steam-hardened cellular concrete products comprising the steps of placing a mold in a chamber, preparing a foamed light weight concrete mass by incorporating gas bubbles therein, casting said foamed concrete mass in said mold, lowering the pressure in said chamber to a value sufficient to cause said gas bubbles in said concrete mass to expand without disappearing from the mass, maintaining a negative pressure in said chamber until said expanded mass has solidified sufficiently to be self-supporting, then admitting steam into said chamber to cure said solidified mass, the mold remaining stationary during the whole process, and finally taking out the hardened cellular concrete body formed by said expanded mass from said chamber and mold.

4. A method for the manufacture of cellular light weight concrete products comprising the steps of preparing a concrete mass suitable for being subsequently expanded, heating said concrete mass to the boiling point of water, foaming said heated mass by injecting steam therein, placing a mold in a chamber, heating said mold and chamber by supplying steam into said chamber, casting said heated and steam-foamed concrete mass in said preheated mold, gradually increasing the temperature in said chamber to follow up the increase of internal temperature of said concrete mass during setting thereof in the mold, until a sufficiently high strength has been imparted to said mass to render it insensible to minor variations of pressure, and then increasing said temperature more rapidly to curing temperature, all by supplying steam into said chamber, maintaining said curing temperature for a sufficiently long period to secure thorough hardening of the expanded concrete mass and finally removing said hardened cellular concrete product from said chamber and mold.

References Cited in the file of this patent

UNITED STATES PATENTS

| | | |
|---|---|---|
| 702,573 | Marx | June 17, 1902 |
| 865,266 | Pauly | Sept. 3, 1907 |
| 1,034,203 | Claes | July 30, 1912 |
| 1,613,639 | Ashenhurst | Jan. 11, 1927 |
| 2,145,731 | Minor | Jan. 31, 1939 |
| 2,850,786 | Dubbs | Sept. 9, 1958 |
| 2,915,802 | Dugas | Dec. 8, 1959 |